US012773874B2

(12) United States Patent
Hisamura et al.

(10) Patent No.: US 12,773,874 B2
(45) Date of Patent: Oct. 27, 2026

(54) BRAKE DISC ASSEMBLY AND OFF-ROAD VEHICLE

(71) Applicant: KAWASAKI MOTORS, LTD., Hyogo (JP)

(72) Inventors: Takashi Hisamura, Akashi (JP); Tatsuya Hatanaka, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 376 days.

(21) Appl. No.: 18/234,905

(22) Filed: Aug. 17, 2023

(65) Prior Publication Data

US 2025/0058584 A1 Feb. 20, 2025

(51) Int. Cl.

*B60B 27/00* (2006.01)
*F16D 65/02* (2006.01)
*F16D 65/12* (2006.01)

(52) U.S. Cl.

CPC ........ *B60B 27/0052* (2013.01); *F16D 65/123* (2013.01); *B60B 2900/113* (2013.01); *B60B 2900/541* (2013.01); *F16D 2065/1384* (2013.01); *F16D 2250/0084* (2013.01)

(58) Field of Classification Search

CPC ........... B60B 27/0052; B60B 2900/113; B60B 2900/541; F16D 65/123; F16D 2065/1384; F16D 2250/0084; F16D 65/067

USPC ............................ 301/109, 6.8; 188/218 XL

See application file for complete search history.

(56) References Cited

U.S. PATENT DOCUMENTS

| | | | | |
|---|---|---|---|---|
| 10,189,309 | B2 * | 1/2019 | Song | F16C 33/583 |
| 2018/0281517 | A1 * | 10/2018 | Gordon | B60G 7/005 |
| 2019/0315400 | A1 * | 10/2019 | Gordon | B62D 7/22 |
| 2021/0362783 | A1 * | 11/2021 | Gordon | B60B 35/128 |
| 2022/0159789 | A1 | 5/2022 | Jin | |

FOREIGN PATENT DOCUMENTS

| | | | | |
|---|---|---|---|---|
| CN | 102963210 A * | 3/2013 | | B60B 27/023 |
| CN | 107428199 A * | 12/2017 | | B60B 27/0052 |
| DE | 102010049947 A1 * | 5/2012 | | B60B 27/0052 |
| DE | 10201821322 A1 * | 6/2020 | | |
| EP | 3655259 B1 * | 9/2021 | | B60B 35/163 |
| KR | 20210090523 A * | 7/2021 | | B60B 27/065 |
| WO | WO-2012107033 A2 * | 8/2012 | | B60B 27/0052 |

* cited by examiner

*Primary Examiner* — S. Joseph Morano
*Assistant Examiner* — Eva L Comino
(74) *Attorney, Agent, or Firm* — XSENSUS LLP

(57) ABSTRACT

A brake disc assembly includes a hub and a brake disc detachably attached to the hub. The brake disc has an opening through which an axle is to penetrate. The hub has first protrusions at the outer periphery of the hub and first recesses at the outer periphery of the hub. The brake disc has second protrusions in the opening and second recesses in the opening. When the brake disc is at a first rotation position, the first protrusions and the second protrusions are attached to each other with overlapping with each other. When the brake disc is at a second rotation position, the first protrusions are within the second recesses and the second protrusions are within the first recesses as viewed in the direction of a center A, and the brake disc does not overlap with the hub in the direction of the center A.

11 Claims, 4 Drawing Sheets

BRAKE DISC ASSEMBLY AND OFF-ROAD VEHICLE

FIELD

The technique disclosed herein relates to a brake disc assembly and an off-road vehicle.

BACKGROUND

U.S. Patent Publication No. 2022/0159789 discloses a brake disc assembly. The brake disc assembly includes a hub attached to an axle and a brake disc attached to the hub. The hub and the brake disc rotate integrally with the axle.

SUMMARY

For example, upon maintenance for the brake disc, the brake disc needs to be attached to and detached from a vehicle. In a case where it is difficult to attach the brake disc to the vehicle and detach the brake disc from the vehicle, a brake disc maintenance efficiency might be degraded.

The technique disclosed herein has been made in view of the above-described point, and an object thereof is to easily attach a brake disc to a vehicle and detach the brake disc from the vehicle.

A brake disc assembly disclosed herein includes a hub attached to an axle of a vehicle and a brake disc located on the inside in the direction of the center of the axle with respect to the hub and detachably attached to the hub. The brake disc has an opening through which the axle is to penetrate. The hub has first protrusions protruding outward in a radial direction about the center in the outer periphery of the hub and first recesses recessed inward in the radial direction in the outer periphery of the hub. The brake disc has second protrusions protruding inward in the radial direction in the opening and second recesses recessed outward in the radial direction in the opening. When the rotation position of the brake disc relative to the hub about the center is a predetermined first rotation position, the first protrusions and the second protrusions are attached to each other with overlapping with each other. When the rotation position of the brake disc relative to the hub about the center is a second rotation position different from the first rotation position, the first protrusions are within the second recesses and the second protrusions are within the first recesses as viewed in the direction of the center, and the brake disc does not overlap with the hub in the direction of the center.

A brake disc assembly disclosed herein includes a hub attached to an axle of a vehicle and a brake disc located on the inside in the direction of the center of the axle with respect to the hub and detachably attached to the hub. The brake disc has a non-circular opening through which the axle is to penetrate. The hub has a non-circular outer shape. When the rotation position of the brake disc relative to the hub about the center is a predetermined first rotation position, the brake disc and the hub are attached to each other with overlapping with each other. When the rotation position of the brake disc relative to the hub about the center is a second rotation position different from the first rotation position, the outer shape of the hub is within the opening as viewed in the direction of the center such that the brake disc does not overlap with the hub in the direction of the center.

An off-road vehicle disclosed herein includes an axle and the above-described brake disc assembly.

The brake disc assembly is configured so that the brake disc can be easily attached to and detached from the vehicle.

The off-road vehicle is configured so that the brake disc can be easily attached to and detached.

DESCRIPTION OF EMBODIMENTS

Figure 1:
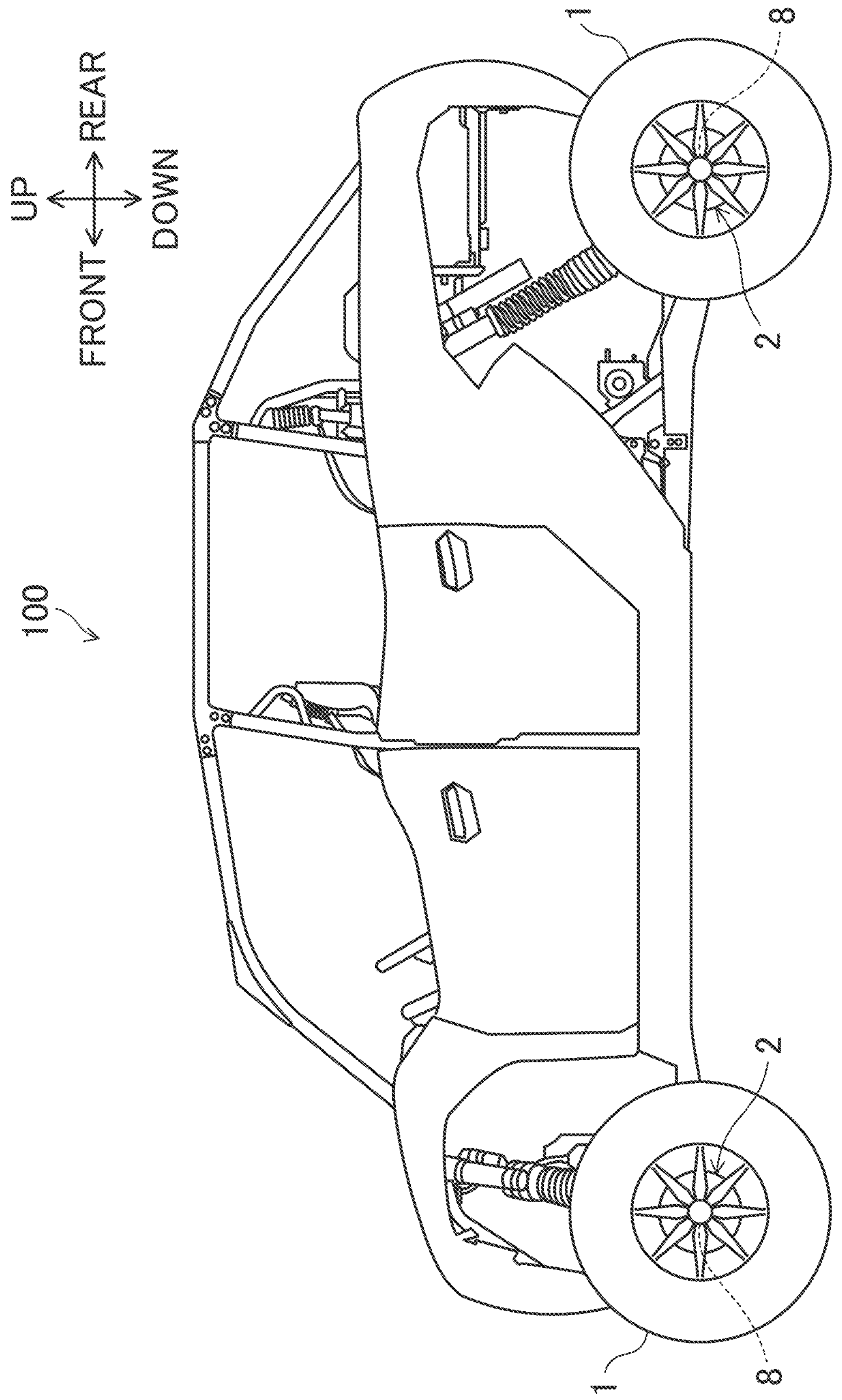
FIG. 1 is a side view of a utility vehicle.

Hereinafter, an exemplary embodiment will be described based on the drawings. FIG. 1 is a side view of a utility vehicle 100. The utility vehicle 100 is a four-wheeled vehicle that can travel off road. The utility vehicle 100 is one example of an off-road vehicle. Hereinafter, the utility vehicle 100 will also be merely referred to as a "vehicle 100."

In the present disclosure, each component of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction."

The vehicle 100 includes wheels 1, axles 8 supporting the wheels 1, and brake disc assemblies 2 attached to the axles 8. The brake disc assembly 2 brakes rotation of the wheel 1. In this example, the vehicle 100 includes two front wheels 1, two rear wheels 1, front axles 8 supporting the two front wheels 1, and rear axles 8 supporting the two rear wheels 1. One brake disc assembly 2 is located for each wheel 1. That is, the vehicle 100 includes four brake disc assemblies 2.

Figure 2:
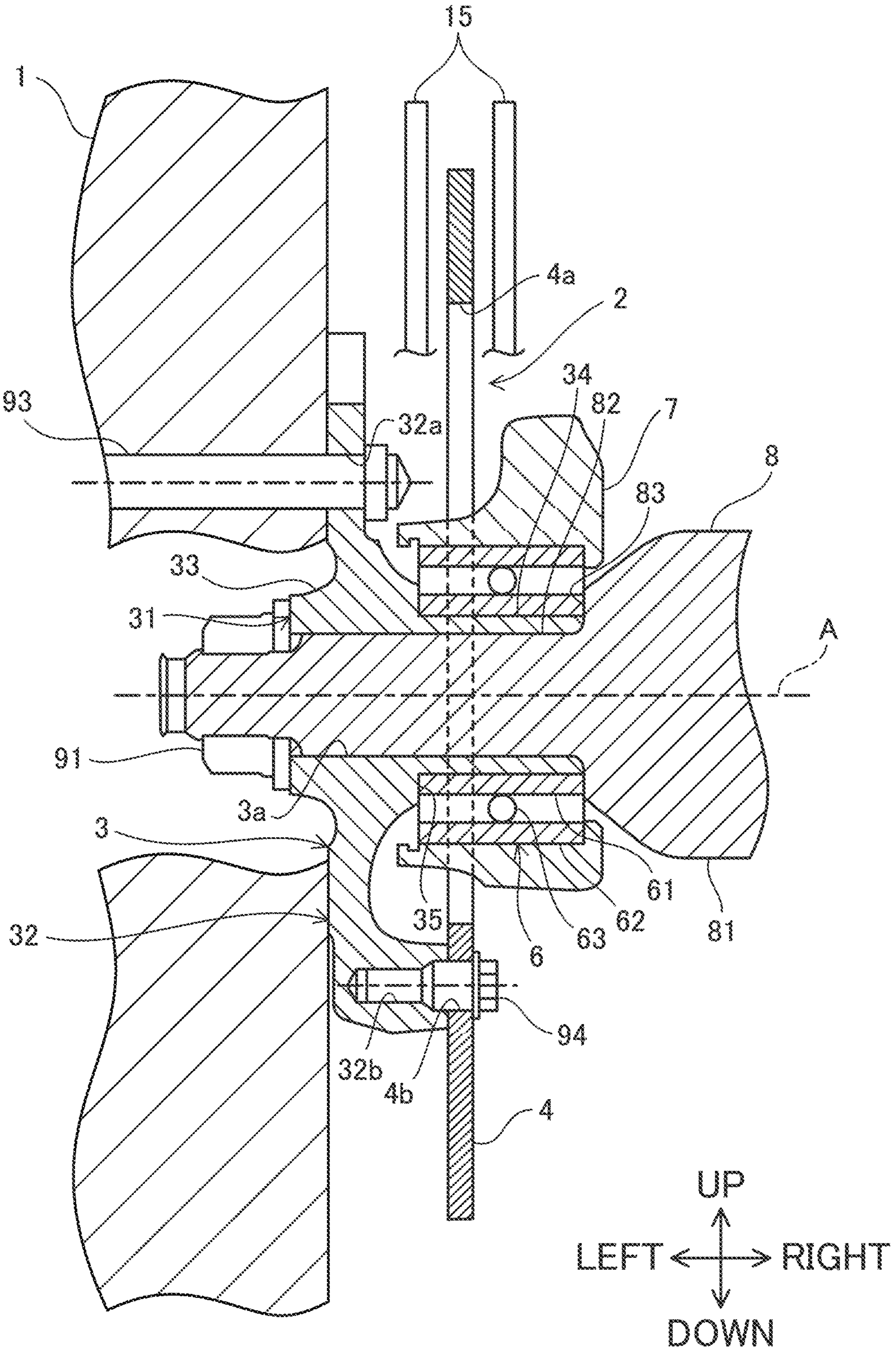
FIG. 2 is a sectional view of a brake disc assembly and members therearound.

FIG. 2 is a sectional view of the brake disc assembly 2 and members therearound. Specifically, FIG. 2 is a sectional view along a plane including the center A of the axle 8. The axle 8 extends along the center A. Unless otherwise specified, an "axial direction" means the direction of the center A, a "radial direction" means a radial direction about the center A, and a "circumferential direction" means a circumferential direction about the center A. The axial direction is substantially coincident with the vehicle width direction. The outside in the axial direction corresponds to the outside in the vehicle width direction, and the inside in the axial direction corresponds to the inside in the vehicle width direction. The axle 8 has a body 81, an end portion 82 positioned on the outside in the axial direction with respect to the body 81 and having a smaller diameter than that of the body 81, and a stepped surface 83 positioned at a boundary between the body 81 and the end portion 82 and facing the outside in the axial direction. The end portion 82 includes an external thread.

The brake disc assembly 2 includes a hub 3 attached to the axle 8 and a brake disc 4 detachably attached to the hub 3. The wheel 1 is located, on the outside in the axial direction, adjacent to the brake disc assembly 2. The wheel 1 is attached to the brake disc assembly 2 (specifically, hub 3).

The hub 3 is unrotatably attached to the axle 8. The wheel 1 and the brake disc 4 are unrotatably attached to the hub 3. With this configuration, the hub 3, the wheel 1, and the brake disc 4 rotate integrally with the axle 8. The hub 3 is made of metal, for example.

The brake disc 4 is located between two brake pads 15. The two brake pads 15 face the brake disc 4 at an outer peripheral edge portion thereof. Upon braking, the two brake pads 15 are pressed against the brake disc 4, thereby reducing or stopping rotation of the brake disc 4 by frictional force. When the brake pads 15 brake rotation of the brake disc 4, rotation of the wheel 1 is braked. The brake disc 4 is made of metal, for example.

Specifically, the hub 3 has an insertion hole 3*a* into which the axle 8 is to be inserted in the axial direction. Specifically, the hub 3 includes a tubular body 31 extending in the axial direction and an annular flange 32 expanding outward in the radial direction from the body 31.

The body 31 has the insertion hole 3*a*. The insertion hole 3*a* penetrates the body 31 in the axial direction. The center of the insertion hole 3*a* is coaxial with the center A. In this example, a bearing 6 is attached to the outer peripheral surface of the body 31. The body 31 has a first tube 33 at which the flange 32 is located, a second tube 34 positioned on the inside in the axial direction with respect to the first tube 33, and a stepped surface 35 positioned at a boundary between the first tube 33 and the second tube 34. The outer diameter of the second tube 34 is less than the outer diameter of the first tube 33. The stepped surface 35 faces inward in the axial direction.

The bearing 6 has a tubular inner case 61 located coaxially with the center A, an outer case 62 located coaxially with the center A and located on the outside in the radial direction with respect to the inner case 61, and balls 63 located between the inner case 61 and the outer case 62. The outer case 62 freely rotates about the center A relative to the inner case 61 through the balls 63. The inner case 61 is unrotatably attached to the outer peripheral surface of the second tube 34 of the body 31. That is, the inner case 61 rotates integrally with the hub 3. A knuckle 7 is unrotatably attached to the outer case 62. That is, when the axle 8 rotates, the knuckle 7 does not rotate because the inner case 61 rotates relative to the outer case 62.

Regarding attachment of the hub 3 to the axle 8, the axle 8 is fitted in the insertion hole 3*a* of the hub 3 with no clearance. For example, the axle 8 is press-fitted in the insertion hole 3*a* Specifically, the end portion 82 of the axle 8 is inserted into the insertion hole 3*a*. The end portion 82 penetrates the body 31 through the insertion hole 3*a*. A nut 91 is screwed onto a portion of the end portion 82 protruding from the insertion hole 3*a*. By fastening the nut 91, the hub 3 is fixed to the axle 8. More specifically, the bearing 6 is located on the outer peripheral surface of the second tube 34 of the body 31. One end of the inner case 61 in the axial direction contacts the stepped surface 35 of the hub 3. The other end of the inner case 61 in the axial direction contacts the stepped surface 83 of the axle 8. By fastening the nut 91, the hub 3 is pressed against the bearing 6, and the bearing 6 is pressed against the stepped surface 83 of the axle 8. The hub 3 is fixed to the axle 8 in this state.

Figure 3:
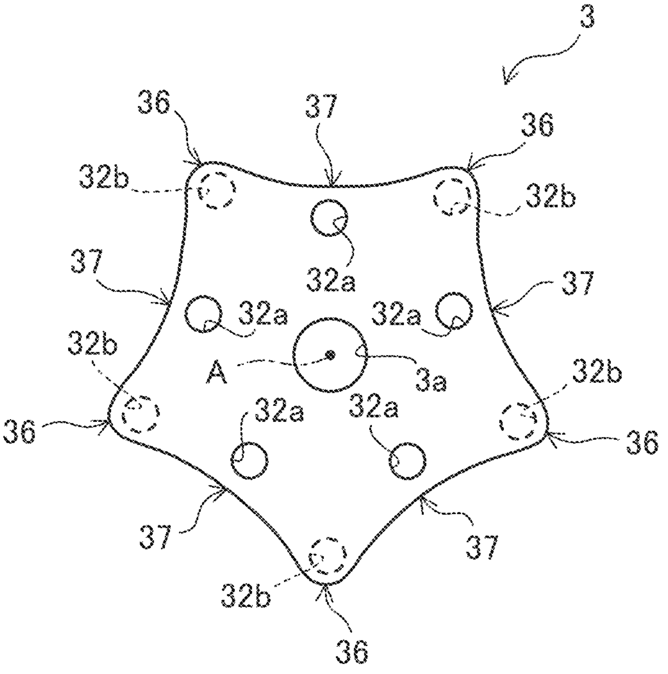
FIG. 3 is a schematic view of a hub as viewed in the direction of the center of an axle.

FIG. 3 is a schematic view of the hub 3 as viewed in the axial direction. The hub 3 has a non-circular outer shape. Specifically, the hub 3 has first protrusions 36 protruding outward in the radial direction in the outer periphery of the hub 3 and first recesses 37 recessed inward in the radial direction in the outer periphery of the hub 3. Specifically, the number of first protrusions 36 is the same as the number of first recesses 37. The first protrusions 36 and the first recesses 37 are alternately located one by one in the circumferential direction. In other words, the first protrusions 36 are aligned in the circumferential direction, and as a result, there is the first recess 37 between each adjacent two of the first protrusions 36. Preferably, the number of first protrusions 36 is four or more. Preferably, the number of first recesses 37 is four or more. The first protrusions 36 are located at equal intervals in the circumferential direction. The first recesses 37 are located at equal intervals in the circumferential direction. In this example, the number of first protrusions 36 is five, and the five first protrusions 36 are located at equal intervals in the circumferential direction. The number of first recesses 37 is five, and the five first recesses 37 are located at equal intervals in the circumferential direction. That is, the outer shape of the hub 3 is substantially a star shape.

The hub 3 has first through-holes 32*a* and screw holes 32*b*. The screw hole 32*b* is one example of a hole for attaching the hub 3 to the brake disc 4. As shown in FIG. 2, each first through-hole 32*a* penetrates the hub 3 in the thickness direction thereof. The wheel 1 and the hub 3 are fastened to each other with bolts 93 each inserted into the first through-holes 32*a*. In this manner, the wheel 1 is fixed to the axle 8 through the hub 3. Each screw hole 32*b* extends in the thickness direction of the hub 3 without penetrating the hub 3. Specifically, as shown in FIG. 3, one first through-hole 32*a* is located for each first recess 37. One screw hole 32*b* is located for each first protrusion 36. In this example, the hub 3 has five first through-holes 32*a* and five screw holes 32*b*.

As shown in FIG. 2, the brake disc 4 is located on the inside in the axial direction with respect to the hub 3 (specifically, outer end of the hub 3 in the axial direction or flange 32).

Figure 4:
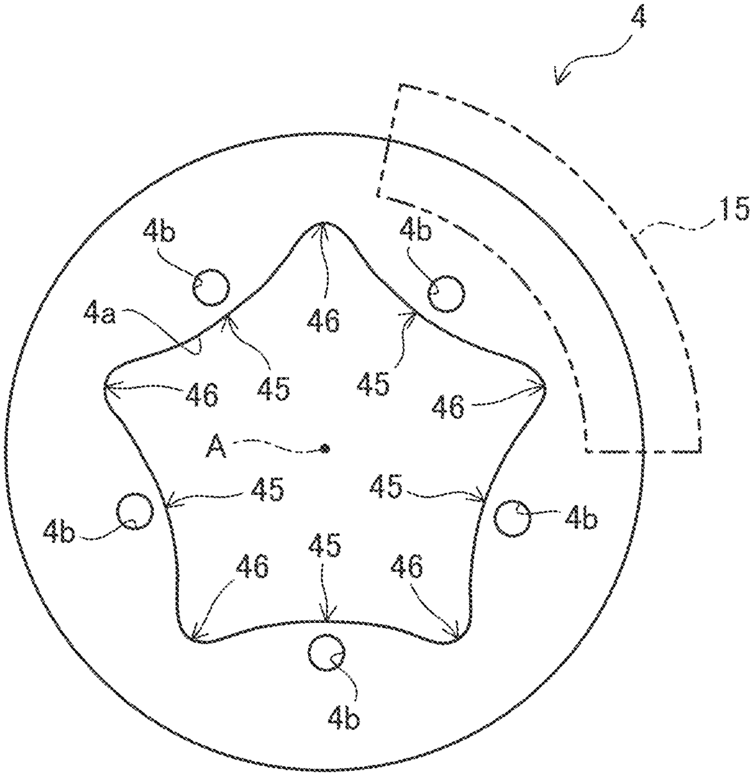
FIG. 4 is a schematic view of a brake disc and a brake pad as viewed in the direction of the center of the axle.

FIG. 4 is a schematic view of the brake disc 4 and the brake pad 15 as viewed in the axial direction. For the sake of convenience in description, the brake pad 15 is indicated by a chain double-dashed line in FIG. 4. The brake disc 4 has a non-circular opening 4*a* into which the axle 8 is to penetrate. Specifically, the brake disc 4 has second protrusions 45 protruding inward in the radial direction in the opening 4*a* and second recesses 46 recessed outward in the radial direction in the opening 4*a*. Specifically, the number of second protrusions 45 is the same as the number of first protrusions 36. The number of second recesses 46 is the same as the number of first recesses 37. The second protrusions 45 and the second recesses 46 are alternately located one by one in the circumferential direction. In this example, the number of second protrusions 45 is five, and the five second protrusions 45 are located at equal intervals in the circumferential direction. That is, the shape of the opening 4*a* is substantially a star shape. More specifically, the shape of the opening 4*a* is similar to the outer shape of the hub 3 as viewed in the axial direction. The projection area of the opening 4*a* in the axial direction is greater than the projection area of the hub 3 in the axial direction. The opening 4*a* is located on the inside in the radial direction with respect to the brake pad 15. In other words, the brake pad 15 does not overlap with the opening 4*a* as viewed in the axial direction.

The brake disc 4 further has second through-holes 4*b*. The second through-hole 4*b* is one example of a hole for attaching the hub 3 to the brake disc 4. As shown in FIG. 2, each second through-hole 4*b* penetrates the brake disc 4 in the thickness direction thereof. The brake disc 4 and the hub 3 are attached to each other with bolts 94 each inserted into the screw holes 32*b* of the hub 3 and the second through-holes

4*b*. In this manner, the brake disc 4 is fixed to the axle 8 through the hub 3. Specifically, the second through-holes 4*b* and the above-described screw holes 32*b* are located on the outside in the radial direction with respect to the knuckle 7 as viewed in the axial direction. More specifically, one second through-hole 4*b* is located for each second protrusion 45, as shown in FIG. 4. In this example, the brake disc 4 has five second through-holes 4*b*.

Figure 5:
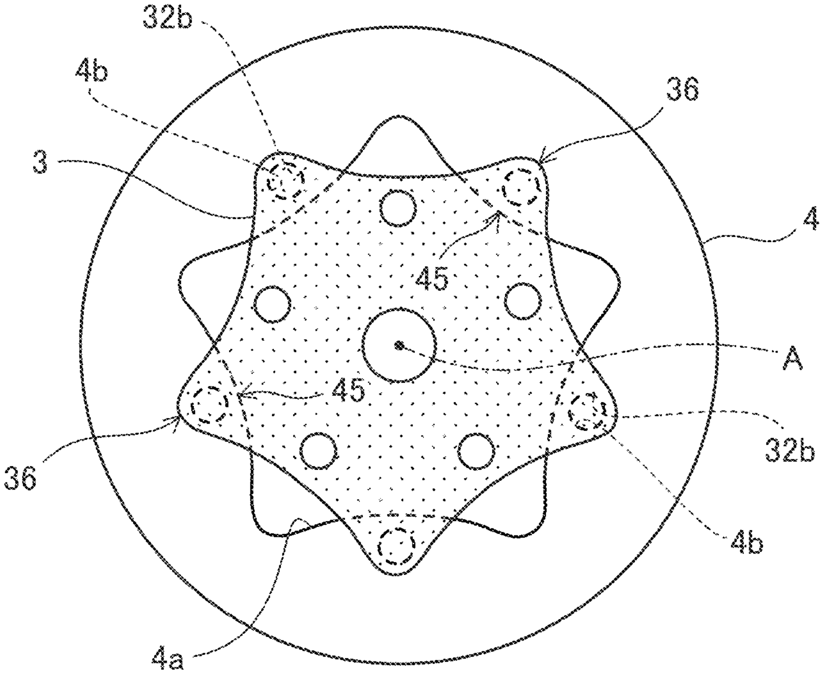
FIG. 5 is a view for describing a first rotation position of the brake disc.
Figure 6:
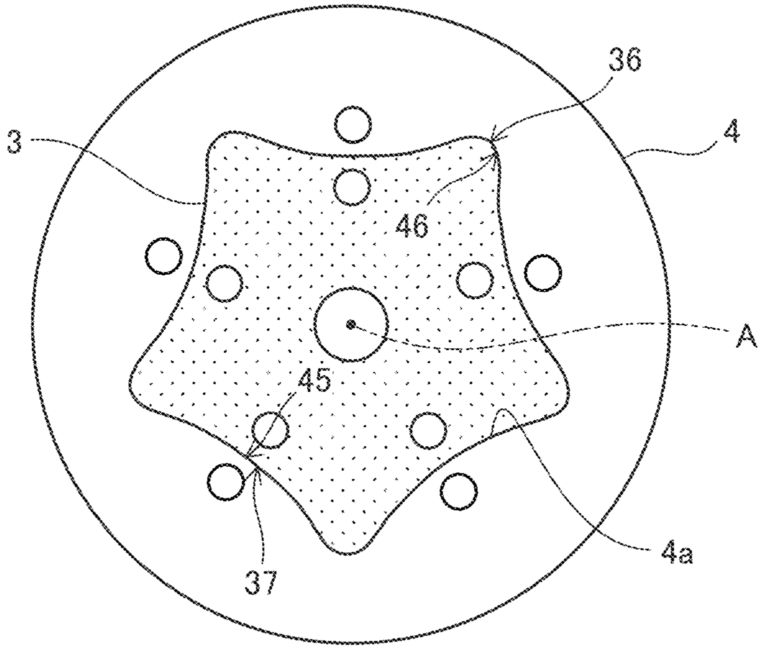
FIG. 6 is a view for describing a second rotation position of the brake disc.

Subsequently, the rotation position of the brake disc 4 relative to the hub 3 will be described. FIG. 5 is a view for describing a first rotation position of the brake disc 4. FIG. 6 is a view for describing a second rotation position of the brake disc 4. For the sake of convenience in description, the hub 3 is dotted in FIGS. 5 and 6. Hereinafter, a "rotation position" means a position in the circumferential direction about the center A. The first rotation position is the rotation position of the brake disc 4 when the brake disc 4 is fixed to the hub 3. The second rotation position is the rotation position of the brake disc 4 when the brake disc 4 is attached to and detached from the hub 3.

As shown in FIG. 5, when the rotation position of the brake disc 4 relative to the hub 3 about the center A is the first rotation position, the brake disc 4 and the hub 3 are attached to each other with partially overlapping with each other. Hereinafter, a "relative rotation position of the brake disc 4" means the rotation position of the brake disc 4 relative to the hub 3 about the center A. When the relative rotation position of the brake disc 4 is the first rotation position, the first protrusions 36 and the second protrusions 45 are attached to each other with overlapping with each other. Specifically, the rotation positions of the first protrusions 36 and the rotation positions of the second protrusions 45 are substantially coincident with each other. Each screw hole 32*b* of the hub 3 overlaps with a corresponding one of the second through-holes 4*b* of the brake disc 4 as viewed in the axial direction. The bolts 94 (see FIG. 2) are each inserted into the screw holes 32*b* and the second through-holes 4*b*, and each first protrusion 36 is fastened to a corresponding one of the second protrusions 45.

As shown in FIG. 6, when the relative rotation position of the brake disc 4 is the second rotation position, the outer shape of the hub 3 is within the opening 4*a* as viewed in the axial direction, and therefore, the brake disc 4 does not overlap with the hub 3 in the axial direction. Specifically, when the relative rotation position of the brake disc 4 is the second rotation position, the first protrusions 36 are within the second recesses 46 and the second protrusions 45 are within the first recesses 37 as viewed in the axial direction, and the brake disc 4 does not overlap with the hub 3 in the axial direction. More specifically, the rotation positions of the first protrusions 36 and the rotation positions of the second recesses 46 are substantially coincident with each other. The rotation positions of the first recesses 37 and the rotation positions of the second protrusions 45 are substantially coincident with each other.

Subsequently, a method for attaching the brake disc 4 to the vehicle 100 and detaching the brake disc 4 from the vehicle 100 will be described.

First, a method for detaching the brake disc 4 from the vehicle 100 will be described. The method for detaching the brake disc 4 from the vehicle 100 includes unfixing the brake disc 4 from the hub 3, rotating the brake disc 4 in the circumferential direction, and pulling the brake disc 4 out of the axle 8 in the axial direction.

Specifically, in the unfixing the brake disc 4 from the hub 3, the bolts 94 (see FIG. 2) fastening the first protrusions 36 and the second protrusions 45 to each other are detached. In this manner, the second protrusions 45 are unfixed from the first protrusions 36.

Next, in the rotating the brake disc 4 in the circumferential direction, the brake disc 4 is rotated in the circumferential direction to displace from the first rotation position (see FIG. 5) to the second rotation position (see FIG. 6). As described above, at the second rotation position, the hub 3 and the brake disc 4 do not overlap with each other as viewed in the axial direction.

Next, in the detaching the brake disc 4 out of the axle 8 in the axial direction, the brake disc 4 is moved outward in the axial direction. At this time, almost no rotation of the brake disc 4 in the circumferential direction is made. In this manner, the hub 3 can pass through the opening 4*a*, and the brake disc 4 can be detached from the axle 8. The hub 3 remains attached to the axle 8. In this manner, the brake disc 4 is detached from the vehicle 100.

Subsequently, a method for attaching the brake disc 4 to the vehicle 100 will be described. The method for attaching the brake disc 4 to the vehicle 100 includes adjusting the relative rotation position of the brake disc 4 on the outside in the axial direction with respect to the axle 8, fitting the brake disc 4 onto the axle 8, rotating the brake disc 4 in the circumferential direction, and fixing the brake disc 4 to the hub 3.

Specifically, in the adjusting the relative rotation position of the brake disc 4, the brake disc 4 is located on the outside in the axial direction with respect to the axle 8 such that the center of the brake disc 4 is coincident with the center A of the axle 8. At this time, the relative rotation position of the brake disc 4 is adjusted to the second rotation position. Note that the hub 3 is attached to the axle 8. As described above, at the second rotation position, the hub 3 and the brake disc 4 do not overlap with each other as viewed in the axial direction.

Next, in the fitting the brake disc 4 onto the axle 8, the brake disc 4 is moved inward in the axial direction. At this time, almost no rotation of the brake disc 4 in the circumferential direction is made. In this manner, the hub 3 can pass through the opening 4*a* of the brake disc 4, and the brake disc 4 can be fitted in the axle 8.

Next, in the rotating the brake disc 4 in the circumferential direction, the brake disc 4 is rotated in the circumferential direction to displace from the second rotation position (see FIG. 6) to the first rotation position (see FIG. 5). At the first rotation position, the first protrusions 36 of the hub 3 and the second protrusions 45 of the brake disc 4 overlap with each other. The relative rotation position of the brake disc 4 is further adjusted such that the screw holes 32*b* of the hub 3 and the second through-holes 4*b* of the brake disc 4 overlap with each other as viewed in the axial direction.

Next, in the fixing the brake disc 4 to the hub 3, the bolts 94 (see FIG. 2) are inserted into the second through-holes 4*b*, and are screwed into the screw holes 32*b*. In this manner, the first protrusions 36 are fixed to the second protrusions 45. In this manner, the brake disc 4 is attached to the vehicle 100.

In the brake disc assembly 2 as described above, the brake disc 4 at the first rotation position is fixed to the hub 3, for example, while the vehicle 100 is traveling. With this configuration, the wheel 1 is braked through the hub 3 when the brake disc 4 is braked. On the other hand, the brake disc 4 is at the second rotation position, for example, upon maintenance for the brake disc 4. At the second rotation position, the outer shape of the hub 3 is within the opening 4*a* of the brake disc 4 as viewed in the axial direction. Thus, even when the brake disc 4 is moved outward in the axial direction with the hub 3 attached to the axle 8, the hub 3 can pass through the brake disc 4, and the brake disc 4 can be detached from the vehicle 100. That is, the hub 3 does not need to be detached from the axle 8, for example, upon maintenance for the brake disc 4. Similarly, in a case of attaching the brake disc 4 to the vehicle 100, the brake disc 4 is set at the second rotation position so that the hub 3 can pass through the brake disc 4 and the brake disc 4 can be attached to the vehicle 100 even when the brake disc 4 is moved inward in the axial direction with the hub 3 attached to the axle 8. In this manner, the brake disc 4 can be easily attached to and detached from the vehicle 100.

In detaching the brake disc 4 from the hub 3, the bolts 94 can be detached or attached without contact with the knuckle 7 because attachment portions (i.e., screw holes 32*b* and second through-holes 4*b*) between the hub 3 and the brake disc 4 are located on the outside in the radial direction with respect to the knuckle 7 as viewed in the axial direction. That is, the brake disc 4 can be easily attached to and detached from the hub 3.

The outer shape of the hub 3 is similar to the shape of the opening 4*a* of the brake disc 4. With this configuration, the size of the opening 4*a* can be minimized, and the greatest possible volume of the brake disc 4 can be ensured. As a result, as compared to a case where the outer shape of the hub 3 is not similar to the shape of the opening 4*a*, the thermal capacity of the brake disc 4 can be increased and thermal dissipation of the brake disc 4 can be improved.

The number of first protrusions 36 of the hub 3 is four or more, and therefore, the strength of connection between the hub 3 and the brake disc 4 can be ensured. Further, the first protrusions 36 are located at equal intervals in the circumferential direction, and therefore, a load acting in the circumferential direction on the hub 3 can be dispersed upon braking.

The opening 4*a* of the brake disc 4 is located on the inside in the radial direction with respect to the brake pad 15 as viewed in the axial direction, and therefore, the greatest possible area of contact between the brake pad 15 and the brake disc 4 upon braking can be ensured. With this configuration, the friction force of the brake pad 15 is not reduced even in a case where the brake disc 4 has the opening 4*a*.

The axle 8 is fitted in the insertion hole 3*a* of the hub 3 with no clearance, and therefore, the rigidity of attachment of the hub 3 to the axle 8 can be ensured. Specifically, when the vehicle 100 turns, if the axle 8 tilts with respect to the vehicle width direction, the hub 3 attached to the axle 8 also tilts with respect to the vehicle width direction. However, the wheel 1 attached to the hub 3 contacts a ground surface, and therefore, a force of tilting the hub 3 with respect to the axle 8 acts on the hub 3. Since the axle 8 is fitted in the insertion hole 3*a* of the hub 3 with no clearance, tilting of the hub 3 with respect to the axle 8 can be reduced even if such force acts on the hub 3. That is, the rigidity of attachment of the hub 3 to the axle 8 can be ensured. In a case where the axle 8 is press-fitted in the insertion hole 3*a* of the hub 3, the rigidity of attachment of the hub 3 to the axle 8 can be further ensured.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to the four-wheeled vehicle, and for example, may be a three-wheeled vehicle.

The outer shape of the hub 3 and the shape of the opening 4*a* are not limited as long as the brake disc 4 and the hub 3 are attached to each other with partially overlapping with each other at the first rotation position and the outer shape of the hub 3 is within the opening 4*a* as viewed in the axial direction such that the brake disc 4 does not overlap with the hub 3 in the axial direction at the second rotation position. The outer shape of the hub 3 is not necessarily similar to that of the opening 4*a* as viewed in the axial direction. For example, the outer shape of the hub 3 may be substantially a hexagonal shape, and the shape of the opening 4*a* may be substantially a star shape.

The number of first protrusions 36 may be three or less. Further, the number of second protrusions 45 may be different from the number of first protrusions 36. For example, the number of first protrusions 36 may be greater than the number of second protrusions 45. The first protrusions 36 are not necessarily located at equal intervals in the circumferential direction.

The opening 4*a* is not necessarily located on the inside in the radial direction with respect to the brake pad 15 as viewed in the axial direction. That is, the opening 4*a* may overlap with the brake pad 15 as viewed in the axial direction. In this case, the size of the opening 4*a* can be increased, and therefore, contact of the brake disc 4 with the hub 3 can be effectively avoided when the brake disc 4 is moved outward or inward in the axial direction. With this configuration, the brake disc 4 can be more easily attached and detached.

The axle 8 may be fitted in the insertion hole 3*a* of the hub 3 with a clearance. With this configuration, the hub 3 can be easily detached from the axle 8, for example, in a case where a defect is caused at the hub 3.

The screw holes 32*b* and the second through-holes 4*b* may overlap with the knuckle 7 as viewed in the axial direction. The screw holes 32*b* and the second through-holes 4*b* may be located on the inside in the radial direction with respect to the knuckle 7 as viewed in the axial direction.

The technique of the present disclosure as described above will be summarized as follows.

[1] The brake disc assembly 2 includes the hub 3 attached to the axle 8 of the utility vehicle 100 (vehicle) and the brake disc 4 located on the inside in the direction of the center A of the axle 8 with respect to the hub 3 and detachably attached to the hub 3. The brake disc 4 has the opening 4*a* through which the axle 8 is to penetrate. The hub 3 has the first protrusions 36 protruding outward in the radial direction about the center A in the outer periphery of the hub 3 and the first recesses 37 recessed inward in the radial direction in the outer periphery of the hub 3. The brake disc 4 has the second protrusions 45 protruding inward in the radial direction in the opening 4*a* and the second recesses 46 recessed outward in the radial direction in the opening 4*a*. When the rotation position of the brake disc 4 relative to the hub 3 about the center A is the predetermined first rotation position, the first protrusions 36 and the second protrusions 45 are attached to each other with overlapping with each other. When the rotation position of the brake disc 4 relative to the hub 3 about the center A is the second rotation position different from the first rotation position, the first protrusions 36 are within the second recesses 46 and the second protrusions 45 are within the first recesses 37 as viewed in the direction of the center A, and the brake disc 4 does not overlap with the hub 3 in the direction of the center A.

According to this configuration, when the brake disc 4 is at the first rotation position, the first protrusions 36 and the second protrusions 45 are attached to each other with overlapping with each other. Thus, the brake disc 4 is attached to the hub 3. While the utility vehicle 100 is traveling, when rotation of the brake disc 4 is braked, the utility vehicle 100 is braked through the hub 3. On the other hand, when the brake disc 4 is at the second rotation position, the first protrusions 36 are within the second recesses 46 and the second protrusions 45 are within the first recesses 37 as viewed in the direction of the center A, and the brake disc 4 does not overlap with the hub 3 in the direction of the center A. Thus, even when the brake disc 4 is moved outward in the direction of the center A with the hub 3 attached to the axle 8, for example, upon maintenance for the brake disc 4, the hub 3 can pass through the brake disc 4, and the brake disc 4 can be detached from the utility vehicle 100. That is, the hub 3 does not need to be detached from the axle 8, for example, upon maintenance for the brake disc 4. Similarly, in a case of attaching the brake disc 4 to the utility vehicle 100, the brake disc 4 is set at the second rotation position so that the hub 3 can pass through the brake disc 4 and the brake disc 4 can be attached to the utility vehicle 100 even when the brake disc 4 is moved inward in the direction of the center A with the hub 3 attached to the axle 8. In this manner, the brake disc 4 can be easily attached to and detached from the utility vehicle 100.

[2] In the brake disc assembly 2 of [1], the hub 3 has the insertion hole 3*a* into which the axle 8 is to be inserted in the direction of the center A, and the axle 8 is fitted in the insertion hole 3*a* with no clearance.

According to this configuration, the rigidity of attachment of the hub 3 to the axle 8 can be ensured.

[3] In the brake disc assembly 2 of [1] or [2], the axle 8 is press-fitted in the insertion hole 3*a*.

According to this configuration, the rigidity of attachment of the hub 3 to the axle 8 can be further ensured.

[4] In the brake disc assembly 2 of any one of [1] to [3], the outer shape of the hub 3 is similar to the shape of the opening 4*a* as viewed in the direction of the center A.

According to this configuration, the size of the opening 4*a* can be minimized, and the greatest possible volume of the brake disc 4 can be ensured. As a result, as compared to a case where the outer shape of the hub 3 is not similar to the shape of the opening 4*a*, the thermal capacity of the brake disc 4 can be increased and the thermal dissipation of the brake disc 4 can be improved.

[5] In the brake disc assembly 2 of any one of [1] to [4], the number of first protrusions 36 is four or more.

According to this configuration, the strength of connection between the hub 3 and the brake disc 4 can be ensured.

[6] In the brake disc assembly 2 of any one of [1] to [5], the first protrusions 36 are located at equal intervals in the circumferential direction.

According to this configuration, the load acting in the circumferential direction on the hub 3 can be dispersed upon braking.

[7] In the brake disc assembly 2 of any one of [1] to [6], the opening 4*a* is located on the inside in the radial direction with respect to the brake pad 15 as viewed in the direction of the center A.

According to this configuration, the greatest possible area of contact between the brake pad 15 and the brake disc 4 upon braking can be ensured. With this configuration, the friction force of the brake pad 15 is not reduced even in a case where the brake disc 4 has the opening 4*a*.

[8] In the brake disc assembly 2 of any one of [1] to [7], the first protrusions 36 and the second protrusions 45 have the screw holes 32*b* and the second through-holes 4*b* (holes for attaching the hub 3 to the brake disc 4) for attaching the hub 3 to the brake disc 4.

According to this configuration, the screw holes 32*b* and the second through-holes 4*b* are located at the first protrusions 36, and therefore, can be located apart from the center A. With this configuration, a process of attaching the brake disc 4 to the hub 3 or a process of detaching the brake disc 4 from the hub 3 can be performed while contact with members located in the vicinity of the axle 8 is avoided. That is, the brake disc 4 can be easily attached to and detached from the hub 3.

[9] In the brake disc assembly 2 of any one of [1] to [8], the screw holes 32*b* and the second through-holes 4*b* are located on the outside in the radial direction with respect to the knuckle 7 as viewed in the direction of the center A.

According to this configuration, the process of attaching the brake disc 4 to the hub 3 or the process of detaching the brake disc 4 from the hub 3 can be performed while contact with the knuckle 7 is avoided. That is, the brake disc 4 can be easily attached to and detached from the hub 3.

The utility vehicle 100 (off-road vehicle) includes the axle 8 and the brake disc assembly 2 of any one of [1] to [9].

According to this configuration, the utility vehicle 100 is configured so that the brake disc 4 can be easily attached and detached.

[11] The brake disc assembly 2 includes the hub 3 attached to the axle 8 of the utility vehicle 100 (vehicle) and the brake disc 4 located on the inside in the direction of the center A of the axle 8 with respect to the hub 3 and detachably attached to the hub 3. The brake disc 4 has the non-circular opening 4*a* through which the axle 8 is to penetrate. The hub 3 has the non-circular outer shape. When the rotation position of the brake disc 4 relative to the hub 3 about the center A is the predetermined first rotation position, the brake disc 4 and the hub 3 are attached to each other with overlapping with each other. When the rotation position of the brake disc 4 relative to the hub 3 about the center A is the second rotation position different from the first rotation position, the outer shape of the hub 3 is within the opening 4*a* as viewed in the direction of the center A such that the brake disc 4 does not overlap with the hub 3 in the direction of the center A.

According to this configuration, when the brake disc 4 is at the first rotation position, the brake disc 4 and the hub 3 are attached to each other with partially overlapping with each other. While the utility vehicle 100 is traveling, when rotation of the brake disc 4 is braked, the utility vehicle 100 is braked through the hub 3. On the other hand, when the brake disc 4 is at the second rotation position, the brake disc 4 does not overlap with the hub 3 in the direction of the center A. Thus, even when the brake disc 4 is moved outward in the direction of the center A with the hub 3 attached to the axle 8, for example, upon maintenance for the brake disc 4, the hub 3 can pass through the brake disc 4, and the brake disc 4 can be detached from the utility vehicle 100. That is, the hub 3 does not need to be detached from the axle 8, for example, upon maintenance for the brake disc 4. Similarly, in a case of attaching the brake disc 4 to the utility vehicle 100, the brake disc 4 is set at the second rotation position so that the hub 3 can pass through the brake disc 4 and the brake disc 4 can be attached to the utility vehicle 100 even when the brake disc 4 is moved inward in the direction of the center A with the hub 3 attached to the axle 8. In this manner, the brake disc 4 can be easily attached to and detached from the utility vehicle 100.

[12] The utility vehicle 100 (off-road vehicle) includes the axle 8 and the brake disc assembly 2 of [11].

According to this configuration, the utility vehicle 100 is configured so that the brake disc 4 can be easily attached and detached.

What is claimed:

1. A brake disc assembly comprising:

a hub attached to an axle of a vehicle and to which a wheel of the vehicle is attached; and a brake disc located on an inside in a rotational axis direction of the axle with respect to the hub and detachably attached to the hub, wherein:

the brake disc includes an opening through which the axle is to penetrate, the hub includes first protrusions protruding outward in a radial direction in an outer periphery of the hub and first recesses recessed inward in the radial direction in the outer periphery of the hub, the brake disc includes second protrusions protruding inward in the radial direction in the opening and second recesses recessed outward in the radial direction in the opening, when a rotation position of the brake disc relative to the hub about a center is a predetermined first rotation position, the first protrusions and the second protrusions overlap and are attached to each other in a state where the second protrusions are located on an inside in the rotational axis direction of the axle with respect to the first protrusions, the first protrusions of the hub and the second protrusions of the brake disc include holes for attaching the hub to the brake disc, and a width of the second protrusions in a direction perpendicular to the radial direction and parallel to a plane of the brake disc and intersecting with the hole of the second protrusion is greater than a width of the first protrusions in a direction perpendicular to the radial direction and parallel to the plane of the brake disc and intersecting with the hole of the first protrusion.

2. The brake disc assembly of claim 1, wherein:

the hub includes an insertion hole into which the axle is to be inserted in the rotational axis direction, and the axle is fitted in the insertion hole with no clearance.

3. The brake disc assembly of claim 2, wherein:

the axle is press-fitted in the insertion hole.

4. The brake disc assembly of claim 1, wherein:

an outer shape of the hub and a shape of the opening as viewed in the rotational axis direction are compatible shapes, allowing the hub to at a specific rotation position, to fit and pass through the opening in the disc, and after rotation to a different position, not allowing the hub to return through the opening in the disc, due to portions of the hub and disc to overlap axially and radially.

5. The brake disc assembly of claim 1, wherein:

a number of first protrusions is four or more.

6. The brake disc assembly of claim 1, wherein:

the first protrusions are located at an equal interval in a circumferential direction about the center.

7. The brake disc assembly of claim 1, wherein:

the opening is located on an inside in the radial direction with respect to a brake pad as viewed in the rotational axis direction.

8. The brake disc assembly of claim 1, wherein:

the holes of the first protrusions of the hub and the holes of the second protrusions of the brake disc are located on an outside in the radial direction with respect to a knuckle as viewed in the rotational axis direction.

9. An off-road vehicle comprising:

an axle; and the brake disc assembly of claim 1.

10. The brake disc assembly of claim 1, wherein:

each of the first protrusions is round in shape.

11. A brake disc assembly comprising:

a hub attached to an axle of a vehicle and to which a wheel of the vehicle is attached; and a brake disc located on an inside in a direction of a rotational axis of the axle with respect to the hub and detachably attached to the hub, wherein:

the brake disc includes an opening through which the axle is to penetrate, the hub includes first protrusions protruding outward in a radial direction about a center in an outer periphery of the hub and first recesses recessed inward in the radial direction in the outer periphery of the hub, the brake disc includes second protrusions protruding inward in the radial direction in the opening and second recesses recessed outward in the radial direction in the opening, when a rotation position of the brake disc relative to the hub about the center is a predetermined first rotation position, the first protrusions and the second protrusions overlap and are attached to each other in a state where the second protrusions are located on an inside in the rotational axis direction of the axle with respect to the first protrusions, and the opening of the brake disc is shaped such that the first protrusions are receivable within the second recesses and the second protrusions are receivable within the first recesses as viewed in a direction of the center, and the brake disc does not overlap with the hub in the direction of the center when the brake disc is oriented at a second rotation position relative to the hub about the center that is different from the first rotation position, the hub includes through holes for attaching a wheel of the vehicle to the hub, and the through holes are positioned at a location corresponding to the first recess, and the number of the through holes is the same as the number of the first recesses.

* * * * *